[11] 3,633,483

| | |
|---|---|
| [72] Inventor | Motoi Nagashima, Tokyo-to, Japan |
| [21] Appl. No. | 63,133 |
| [22] Filed | Aug. 12, 1970 |
| [45] Patented | Jan. 11, 1972 |
| [73] Assignee | Shima Kogaku Kabushiki Kaisha, Tokyo-to, Japan |
| [32] Priority | Dec. 31, 1967 |
| [33] | Japan |
| [31] | 43/200 |

Original application Aug. 27, 1968, Ser. No. 755,665, now Patent No. 3,566,765. Divided and this application Aug. 12, 1970, Ser. No. 63,133

[54] DEVICE FOR CONTINUOUSLY ALTERING THE FOCAL LENGTH OF PHOTOGRAPHIC LENSES
1 Claim, 3 Drawing Figs.

[52] U.S. Cl. .................................... 95/44 R, 95/45, 350/187
[51] Int. Cl. .................................... G03b 3/00, G02b 15/00
[50] Field of Search ........................ 95/44, 45; 350/187

[56] References Cited
UNITED STATES PATENTS
| | | | |
|---|---|---|---|
| 3,059,533 | 10/1962 | Mellberg ................ | 95/45 X |
| 3,351,411 | 11/1967 | Chapman ................ | 95/45 X |

*Primary Examiner*—Samuel S. Matthews
*Assistant Examiner*—Richard A. Wintercorn
*Attorney*—Otto John Munz ABSTRACT: A device for continuously altering the focal length of photographic lenses, which is detachably mounted between the camera body and the objective lens unit containing a diaphragm means and which comprises an operating ring means capable of continuously altering the focal length of the objective lens system or, in other words, the magnification of the objective lens system by a mere rotation of said operating ring means causing said objective lens unit to be driven forwardly or backwardly in the direction of the optical axis of said objective lens unit and a built-in diaphragm actuating rod means capable of making telescopic movement in accordance with the forward or backward movement of said objective lens unit, whereby effecting the automatic operation of the diaphragm means in interlocking relation with the operation of the shutter button which is provided on the camera body, regardless of whichever focal length adjusting position occupied by said operating ring means.

PATENTED JAN 11 1972

3,633,483

INVENTOR
MOTOI NAGASHIMA

BY

ATTORNEY 3,633,483

DEVICE FOR CONTINUOUSLY ALTERING THE FOCAL LENGTH OF PHOTOGRAPHIC LENSES

CROSS-REFERENCE TO RELATED APPLICATIONS

This application is a division of copending U.S. application Ser. No. 755,665, filed Aug. 27, 1968, now U.S. Pat. No. 3,566,765, issued Mar. 2, 1971 for Rear Converter for Photographic Lenses, filed with claim of priority to the filing date of Dec. 31, 1967, of the corresponding Japanese application No. 200/68, and the priority dates of these applications are claimed for all subject matter common therewith.

BACKGROUND OF THE INVENTION

1. Field of the Invention

The present invention is concerned with a device which is detachably mounted between the objective lens unit of a photographic camera and the camera body, and more particularly, it is related to a device which is capable of continuously altering the focal length of the objective lens system and which comprises a diaphragm actuating rod means capable of telescopically moving in accordance with the changes in said focal length.

2. Description of the Prior Art

In general, as the method for altering the focal length or the magnification of the objective lens system of photographic cameras, zoom lens system or conversion lens system is known. The zoom lens system, above all, is comprised of a multitude of lenses which are arranged in complicated manner, and as a natural result, the size of the entire zoom lens system has inevitably been large, which, in turn, has led to the relatively high price of such system. Known conversion lens system, on the other hand, has the drawbacks such that it was not capable of continuously altering the focal length or the magnification of the objective lens system and also that its user was compelled to carry along with him some different conversion lenses and to use, for each selection of a different magnification in taking photographs, one of these conversion lenses in exchange with the conversion lens which has been mounted till then on the cameras.

SUMMARY OF THE INVENTION

It is, therefore, an object of the present invention to provide a device for use in photographic cameras, which, by only a single unit, is capable of continuously altering the focal length of the photographic lens.

Another object of the present invention is to provide a device for photographic lenses, which has a built-in diaphragm actuating rod means which is capable of automatically operating the diaphragm means contained within the objective lens unit in interlocking relation with the operation of the shutter button which is provided on the body of the camera.

Other objects and attendant advantages of the present invention will become apparent by reading the following description in conjunction with the accompanying drawings.

BRIEF DESCRIPTION OF THE DRAWINGS

In FIGS. 1 and 2, there is shown a device which is suitable for use with a photographic lens of the type that the diaphragm means (not shown) which is built within the standard objective lens unit generally indicated by the letter A is operated by an operating rod means which is adapted to rotate concentrically with the optical axis 0 of the lens in interlocking relation with the downward depression of the shutter button (not shown) which is provided on the body B of the camera. The device which is generally indicated by the letter C is detachably mounted to the camera body generally indicated at B by a mount portion 1b which is provided at the rear section of a cylindrical casing 1 having a threaded portion 1a which is formed on the inner circumferential face of said cylindrical casing 1. In said cylindrical casing 1 is contained a cylinder 2 having a flange 2a which is adapted to be brought into contact with the forward end face of said casing and also having a threaded portion 2b which is screwed into said threaded portion 1a of said casing 1. Inside the cylinder 2, in turn, there is inserted an intermediate cylinder 3 having an inner circumferential face on which is formed a threaded portion 3a. Said cylinder 2 is integrally coupled by means of a screw 4 to said intermediate be 3. On the external side of the cylindrical casing 1 is mounted an operating ring 5 which is provided with magnification indicating graduation 5a which are arranged so as to face the fixed indicator 1c provided on the casing 1. Said operating ring 5 is integrally coupled by means of a screw 6 to the cylinder 2. Inside the intermediate cylinder 3, there is inserted a cylinder 7 having a threaded portion 7a which is screwed into said threaded portion 3a and also having a mount portion 7b for attaching the objective lens unit A. This cylinder 7 is arranged so as to be limited of its movement in such a way that it is allowed to move in the direction of the optical axis by means of a guide bar (not shown) which is fixed to the cylindrical casing 1 but is unable to rotate concentrically with the optical axis 0. A cylinder 8 is disposed in said casing 1 in concentric relation with the optical axis 0, and is coupled by an appropriate coupling member (not shown) to the cylinder 2 so as to be rotated integrally with the latter. Said cylinder 8 has, in the form of being slidably fitted therein, a cylinder 9 which is provided with a spiral groove 9a on its outer circumferential face and which supports a group 10 of auxiliary lenses. In said spiral groove 9a is fitted the tip of a screw 8a which is threaded into the cylinder 8. Also, the cylinder 9 is limited of its movement in such a way that it is only allowed to slide, by means of a member not shown, in the direction of the optical axis but is unable to rotate about the optical axis 0. Accordingly, as the cylinder 8 is rotated, said cylinder 9 will be caused to move either forwardly or backwardly along the optical axis 0 owing to the engagement of said screw 8a with said spiral groove 9a. In FIG. 1, there is seen a ring 19 which is rotatably fitted onto the flange 7c of the cylinder 7 which is intended to serve as the mount for the objective lens unit A. This ring 19 is retained there in such a way that it is not allowed to move in the direction of the optical axis by means of a ring plate 20 which is securely attached to the cylinder 7 and which has an arcuate slot 20a (see FIG. 2) formed therethrough so as to be concentric with the optical axis 0. Onto the inner peripheral face of said ring 19, there is attached, by means of a screw 21, a first connecting rod 22 which is arranged so that it can engage, when the objective lens unit A has been mounted to the cylinder 7, an operating lever 23 which is intended for operating the diaphragm means contained in the objective lens unit A. This connecting rod 22 has a slot 22a which is formed therethrough. Into this slot 22a is loosely inserted a pin 24a which projects outwardly from a plate 24 intended for slidably supporting the connecting rod 22 by such a means as flanged rivets 26 which are carried on said plate 24. This plate 24 slidably supports thereon, by such means as flanged revits 26, a second connecting rod 25 which has a slot 25a formed therethrough. Into this slot 25a is inserted a pin 24b which projects outwardly from the plate 24. The rear end portion of said second connecting rod 25 is attached, by means of a screw 29, onto the inner peripheral face of a ring 27 which is rotatably fitted onto a shoulder portion 1e of the casing 1. This ring 27 is retained there in such a way that it is not allowed to move in the direction of the optical axis 0 by means of a ring plate 28 which is securely attached to the rear portion of the casing 1. Said rear end portion of said second connecting rod 25 further protrudes beyond said rear end face of the casing 1 and is so arranged that it is put into motion in interlocked relation with a shutter button (not shown) after the objective lens A has been mounted to the body B of a camera. The spiral of the threaded portion 2b and the threaded portion 3a are so formed that the directions of these two spiral are opposite to each other.

Figure 1:
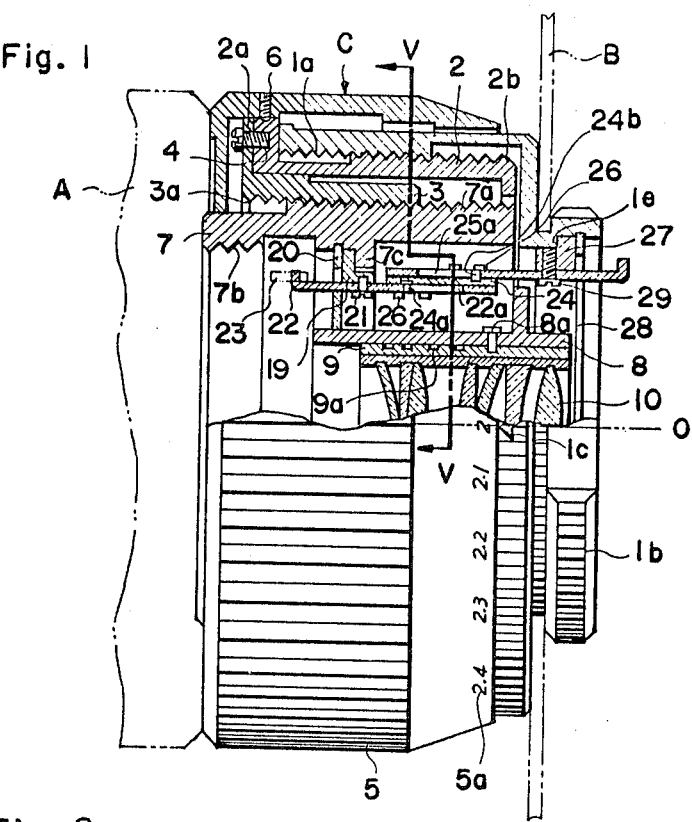
FIG. 1 is a side elevation, in an enlarged scale and partly in longitudinal section, of the device of the present invention.
Figure 2:
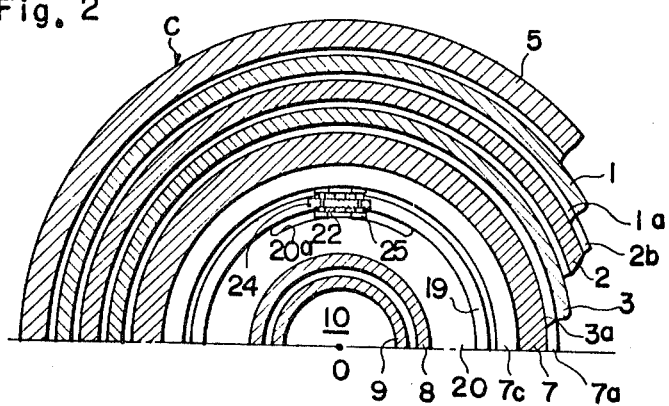
FIG. 2 is a fragmental sectional view taken along the line V—V in FIG. 1.
Figure 3:
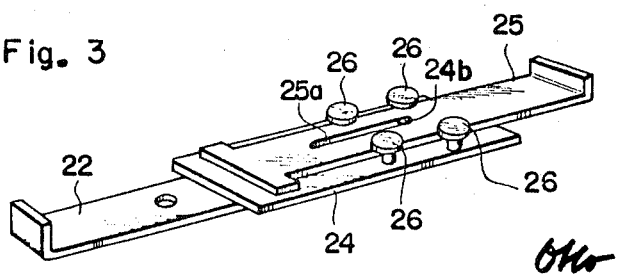
FIG. 3 is a perspective view showing the details of the diaphragm operating rod means which is illustrated in FIGS. 1 and 2.

Description will hereunder be directed to the function of the embodiment shown in FIGS. 1, 2 and 3.

As the operating ring 5 is rotated, this operating ring 5 will make a forward or backward movement in the direction of the optical axis for a distance which is determined by the pitches of the threaded portions 1a and 2b while rotating jointly with the cylinder 2 and the intermediate cylinder 3, relative to the casing 1. Accordingly, the cylinder 7 which is intended for mounting the objective lens unit A will also make a forward or backward movement in the direction of the optical axis for a distance which is determined by the pitches of the threaded portions 3a and 7a. Also, as the operating ring 5 is rotated, the cylinder 8 will advance or retreat in the direction of the optical axis whilst rotating integrally with said operating ring 5. This movement of the cylinder 8 will the cylinder 9—and accordingly the group 10 of auxiliary lenses—to make a forward or backward movement while retaining a certain positional relation relative to the operating ring 5, to thereby effect the progressive or retrogressive alteration of the magnification of the objective lens system which contains the objective lens unit A. The value of the magnification which is set in the manner described above is obtained by reading the magnification indicating graduation 5a at the point directed by the fixed indicator 1c. On the other hand, as the cylinder 7 moves forwardly or backwardly, said first connecting rod 22 and said second connecting rod 25 will accordingly be driven to move, through the intervention of the plate 24 therebetween, in the direction of the optical axis relative to said plate 24. Accordingly, the distance between the foremost end of the first connecting rod 22 and the rear end of the second connecting rod 25 will expand or reduce by an amount which is equal to the amount of the advance or retreat effected by the cylinder 7. After the completion of the adjustment of magnification of the objective lens system in such manner as described above and then the focusing of the objective lens unit A in the conventional manner, the shutter button (not shown) is depressed. Whereupon, via a known interlocking mechanism, the second connecting rod 25 will be rotated concentrically with the optical axis 0 during the initial triggering motion of said interlocking mechanism. As a result, the first connecting rod 22 will, via the plate 24, make an integral movement with said second connecting rod 25, causing the operating lever 23 which is intended to operate the diaphragm means contained in the objective lens unit A to rotate concentrically with the optical axis 0. As a known sequence, the diaphragm blades (not shown) are driven so as to change their position from the of the full open aperture to the position of the preset desired aperture. Upon the release of the depression which has been exerted upon the shutter button following the exposure, all of the operating lever 23, the first connecting rod 22 and the second connecting rod 25 will be simultaneously brought back to their own initial positions by the action of the elastic force of the spring not shown, so that the diaphragm blades will accordingly resume their position of the full open aperture.

As will be clearly understood the foregoing description which has been made in connection with this embodiment which is given by way of example, the focal length or the magnification of the objective lens system of a camera, according to the present invention, can be altered continuously by the rotation of the operating ring 5 of the device C and besides, the length of the operating rod means which is intended for actuating the diaphragm means is adapted to expand or reduce in accordance with the movement, in the direction of the optical axis and relative to the cylindrical casing 1, of the cylinder 7 which serves as the mount for the objective lens unit. As such, according to the present invention, the device of this embodiment can be quite effectively used in single reflex cameras in particular.

I claim:
1. A device for continuously altering the focal length of photographic lenses adapted to be detachably mounted between an objective lens unit A and a camera body B, comprising:
   a cylindrical casing 1 detachably mounted to said camera body B;
   an operating ring means having an outside threaded portion 2b and an inside threaded portion 3a, said outside threaded portion 2b rotatably screwed into said cylindrical casing 1;
   a first cylinder 7 for mounting said objective lens unit A screwed into said operating ring means so as to be movable only in the direction of the optical axis of said objective lens unit A;
   a second cylinder 8 disposed in said first cylinder 7 in concentric relation with said optical axis and integrally coupled to said operating ring means;
   a third cylinder 9 mounted in said second cylinder 8 so as to be movable only in the direction of said optical axis by the rotation of said second cylinder 8;
   an auxiliary lens group supported to said third cylinder 9; and
   a diaphragm actuating rod means comprising a first connecting rod 22 attached to said first cylinder 7 so as to be rotatable only concentrically with said optical axis and a second connecting rod 25 attached to said cylindrical casing 1 so as to be rotatable only concentrically with said optical axis, said first and second rods being disposed in the space between said first cylinder 7 and said second cylinder 8 and also being coupled to each other for relative movement only in the direction of the optical axis;
   the spiral of said outside threaded portion 2b and that of said inside threaded portion 3a being so formed that the directions of said two spirals are opposite to each other, whereby said first cylinder 7 and said first connecting rod 22 are moved forwardly or backwardly along said optical axis in the same direction by an equal amount when said operating ring means is rotated.

* * * * *